D. M. ROBERTSON.
SPROCKET CHAIN.
APPLICATION FILED MAR. 31, 1917.

1,282,463.

Patented Oct. 22, 1918.
2 SHEETS—SHEET 2.

WITNESSES:
Charles Robles
Julius C. Benesch

INVENTOR
Donald M. Robertson
BY Strong & Townsend
ATTORNEYS

UNITED STATES PATENT OFFICE.

DONALD M. ROBERTSON, OF STOCKTON, CALIFORNIA, ASSIGNOR TO THE HOLT MANUFACTURING COMPANY, OF STOCKTON, CALIFORNIA, A CORPORATION OF CALIFORNIA.

SPROCKET-CHAIN.

1,282,463.  Specification of Letters Patent.  Patented Oct. 22, 1918.

Application filed March 31, 1917. Serial No. 158,836.

*To all whom it may concern:*

Be it known that I, DONALD M. ROBERTSON, a citizen of the United States, residing at Stockton, in the county of San Joaquin and State of California, have invented new and useful Improvements in Sprocket-Chains, of which the following is a specification.

This invention relates to sprocket chains made up of a series of articulated link sections, wherein the joint between adjacent links is formed by a tubular block and a pin. The invention is particularly useful in connection with endless chain tracks employed in tractors of the self-laying track type.

The object of the invention is to provide an improved oiling system for the joint between the links.

Generally stated, the invention comprises an oil reservoir formed on the link in position to clear the sprocket teeth of the wheel, over which the chain runs, and arranged to automatically feed oil to the bearing surface between the block and pin and distribute the same evenly throughout said bearing surface, whereby to lubricate the joint and keep out dirt therefrom. The automatic operation of the control of the oiling system is obtained by taking advantage of the changes in the relative positions of adjacent links in passing around the circuit of the chain.

One form which my invention may assume is exemplified in the following description and illustrated in the accompanying drawings, in which—

Figure 1:
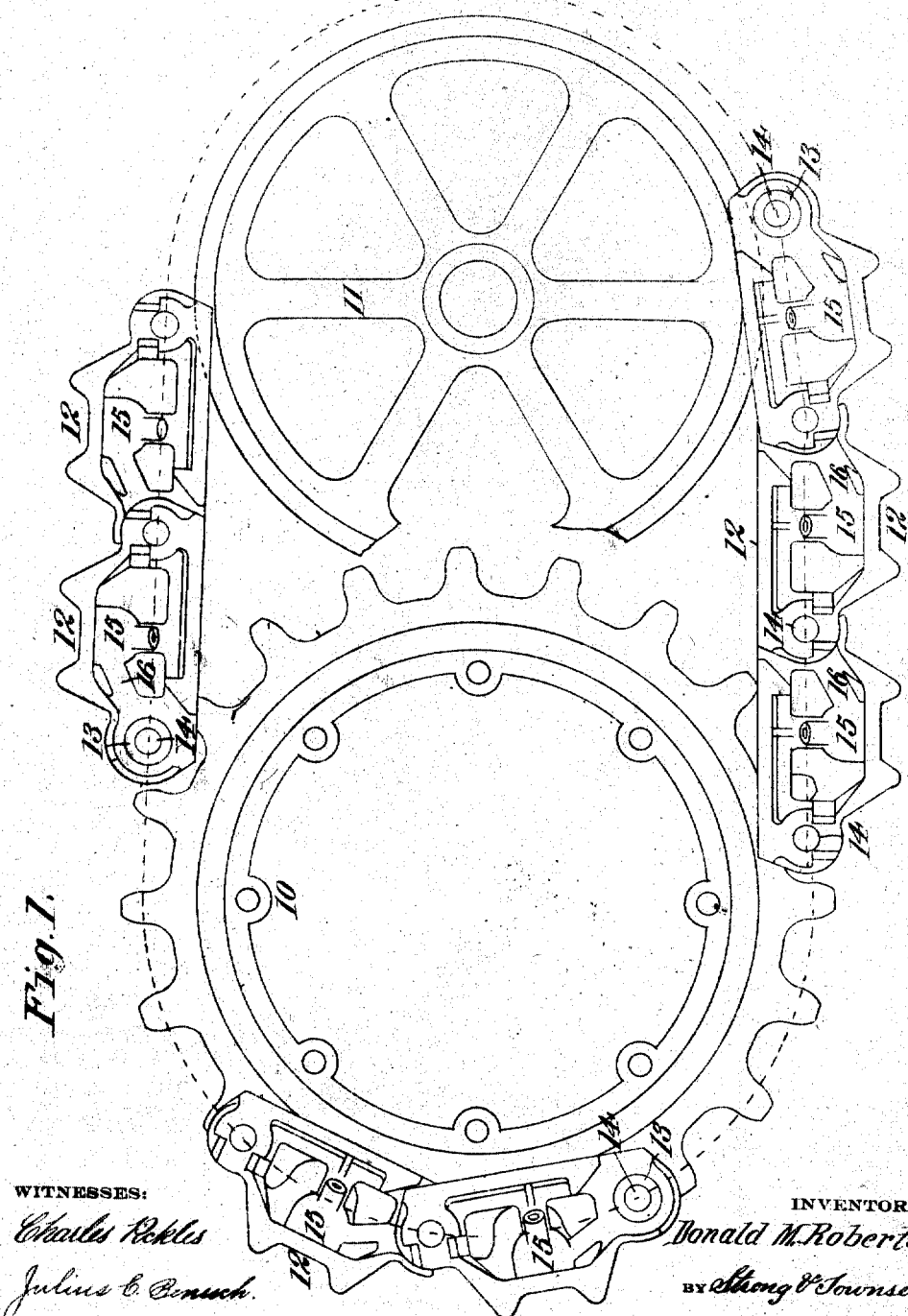
Figure 1 shows a side elevation of a chain track embodying my invention.
Figure 2:
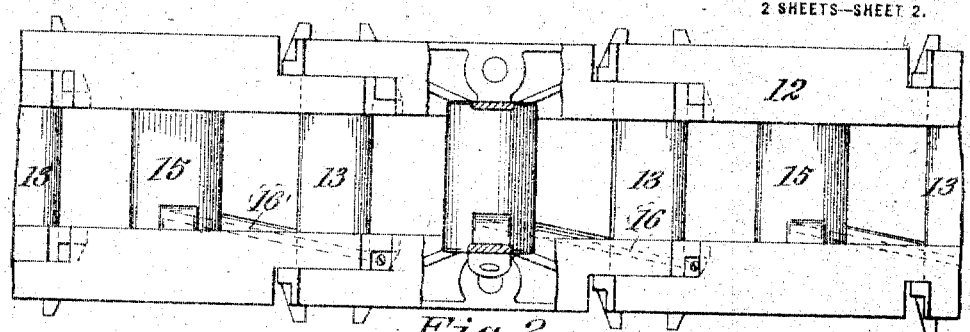
Fig. 2 shows a plan view of the bottom run of the chain.
Figure 3:
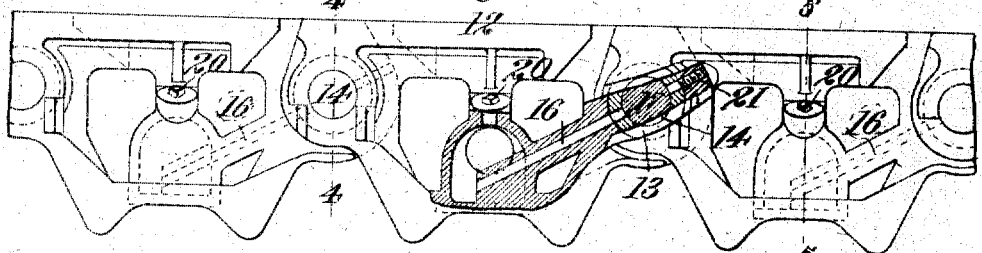
Fig. 3 shows a side elevation of the same.
Figure 4:
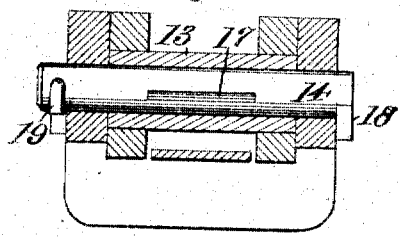
Figs. 4 and 5 show cross sectional views, taken on the correspondingly numbered lines of Fig. 3.
Figure 5:
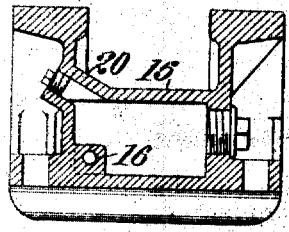

Figs. 6 to 9, inclusive, show sectional views of the joint, illustrating the relative changes in the positions of the pin and block in passing around the circuit of the chain.

In illustrating one application of my invention, I show an endless chain track passing around a sprocket driving wheel 10 at the rear, and a blank carrying or idler wheel 11 at the front. The chain track is made up of a series of articulated link sections 12, each embodying spaced side bars connected by a tubular block 13 pressed thereon. A pin 14, passing through the tubular block, connects adjacent links together.

The present invention provides an oiling system for each joint, such that oil will be fed thereto automatically by changes in the relative positions of the links in passing around the circuit of the chain. This system comprises a reservoir 15, arranged centrally on each link between the side bars and preferably cast integral therewith, leaving a space between itself and the adjacent sleeve or block 13 for the reception of a tooth on a sprocket driving wheel 10, it being customary in machines of this class to provide two teeth for each link.

The reservoir is positioned near the outer face of the link so that when the link is on the bottom run of the chain the level of the oil in said reservoir will be below the pin and block to be lubricated thereby. From the reservoir a duct 16 passes upwardly and forwardly to the block 13, being extended along the inner side of one of the side bars so as to clear the teeth of the sprocket wheel. This duct is formed by providing an enlargement along the side bar in casting the same and boring this enlarged portion after the sleeve or block has been driven into place; the bore passing diametrically through the sleeve or tubular block and entering the reservoir at a point near the bottom thereof. By having the oil duct enter the reservoir near the bottom thereof the oil will not run out when the link is on the upper run of the chain unless the reservoir be completely filled with oil.

Figure 6:
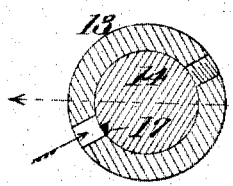
Figure 7:
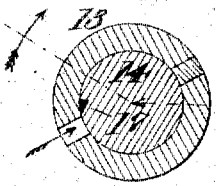
Figure 8:
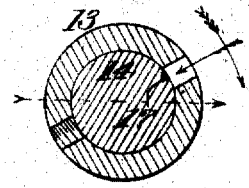

Adjacent to the opening in the sleeve 13 is a longitudinal groove 17 formed on the pin 14, but only when adjacent links are disposed in a straight line on either the upper or lower run of the chain is said groove in communication with the aperture in the sleeve. This is indicated in Figs. 6 and 8. The pin 14 is fixed to and movable with the link which embraces the link carrying the sleeve by reason of the provision of a head 18 and cotter pin 19 at opposite ends of the pin seated on the embracing link.

Figure 9:
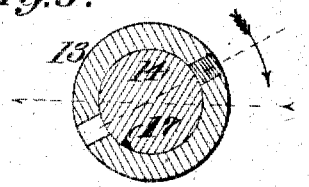

When the link is moving along the ground in a horizontal position oil will not be fed to the joint, owing to the lower position of the reservoir, but in passing upwardly and around the sprocket wheel 10, the reservoir is raised above the joint and oil will flow through the duct 16 and into the aperture formed on the sleeve. At this time, however, the slot 17, in the pin, has moved out of registry with the opening in the sleeve which communicates with the oil duct (see Fig. 7). Oil, however, is deposited in the duct 16 and in the walls of the sleeve, so that when the links assume a straight line on the upper run of the chain, as shown in Fig. 8, at which time the groove 17 has returned to registering position with the oil duct, the said groove will be filled with oil. Then as the links flex in passing around the front idler wheel 11, as shown in Fig. 9, the slot 17 moves to one side of the position occupied in passing around the sprocket driving wheel. This oscillation of the pin within the sleeve will serve to distribute oil throughout the entire bearing surface.

Such an arrangement provides a constant supply of oil for the joint, whereby to lubricate the bearing surface and keep out dirt. The oil is evenly distributed and its feeding is automatically accomplished, due to the movement of the chain, and an advantage over ordinary gravity oil feeds is that comparatively few of the links are disposed at one time in such position as to have the head pressure of the oil reservoir exerted upon the bearing, these being limited to the few links passing around the drive wheel. Therefore if the machine be left idle for a long period of time only the reservoir carried by the few links fitting around the drive wheel would be at all subject to leakage, whereas if the ordinary gravity oil cups were employed all of those on one of the horizontal runs of the chain would be subject to leakage when the machine was stationary.

The oil reservoir is shown as being tapped at 20 to receive its supply from the outer side of the link, said tap being closed by a screw plug. The end of the duct 16, adjacent to the sleeve, is closed by a screw-threaded plug 21.

Various changes in the construction and arrangement of the several parts herein shown and described may be employed without departing from the spirit of my invention as disclosed in the appended claims.

Having thus described my invention, what I claim and desire to secure by Letters Patent is—

1. The combination with an endless chain made up of a series of articulated link sections and arranged for operation in a vertical plane, of means for applying a measured amount of oil to the joints between the links of the upper run of the chain, said means having its supply controlled by the changes in the relative positions of the links in moving around the circuit of the chain.

2. The combination with an endless chain made up of a series of articulated link sections and arranged for operation in a vertical plane, of means carried by said chain to supply a limited amount of oil to the joints when the links are moving horizontally along the upper run of the chain.

3. The combination with an endless chain made up of a series of articulated link sections and arranged for operation in a vertical plane, of an oil reservoir for each link, and means to conduct limited amounts of oil from said reservoirs to the joints between the links of the upper run of said chain.

4. A sprocket chain made up of a series of articulated link sections, the joint between the links being formed by a tubular block and a pin, and said chain being arranged for operation in a vertical plane, a reservoir carried centrally and near the outer face of each link, and obliquely disposed communicating means between the reservoir and interior of the block, said communicating means opening into the reservoir at a point above the level assumed by the oil when the link is in the upper run of the chain.

5. The combination with a sprocket chain made up of a series of articulated link sections, having joints between the links formed by tubular blocks and pins, the block being movable with one link and the pin with the adjacent link, of means automatically operable during the movement of the chain to supply oil at intervals to a duct in the block, the pin having a groove movable into registry with the duct after the supply has been cut off, whereby to distribute the oil within the bearing.

6. A sprocket chain made up of a series of articulated link sections having side bars, the joints between the links being formed by tubular blocks and pins, each link having a reservoir formed centrally thereon, leaving a space between it and the adjacent block to receive the teeth of the sprocket wheel, and communicating means between the joint and reservoir extending along one of the side bars.

7. A sprocket chain made up of a series of articulated link sections, the joints between articulated link sections, the joints between the links being formed by tubular blocks and pins, the block being movable with one link and the pin with the adjacent link and said chain being arranged to operate in a vertical plane, and a reservoir formed near the central portion of each link and communicating with the interior of the block through an obliquely disposed duct, said reservoir being so positioned as to supply oil to the duct only when moving vertically at the end of the run, the pin having a groove movable into registry with the duct after the supply of oil has been cut off.

8. A link for sprocket chains, comprising a tubular block, spaced side bars connected at one end by the tubular block, a reservoir formed on the central portion of said link, and communicating means extending along one of the side bars between the interior of said reservoir and the block.

9. A link for sprocket chains, comprising spaced side bars, an oil reservoir arranged centrally thereon and cast integral with the side bars, a sleeve pressed into and connecting the bars at one end and means to place the interior of the sleeve and reservoir in communication with each other, said means including a tubular casting on one of the side bars extending to the bottom of the reservoir.

In testimony whereof I have hereunto set my hand in the presence of two subscribing witnesses.

DONALD M. ROBERTSON.

Witnesses:
F. W. TARR,
J. G. SMITH.